June 20, 1967 P. H. SMITH 3,326,119
TRAY
Filed Dec. 9, 1963
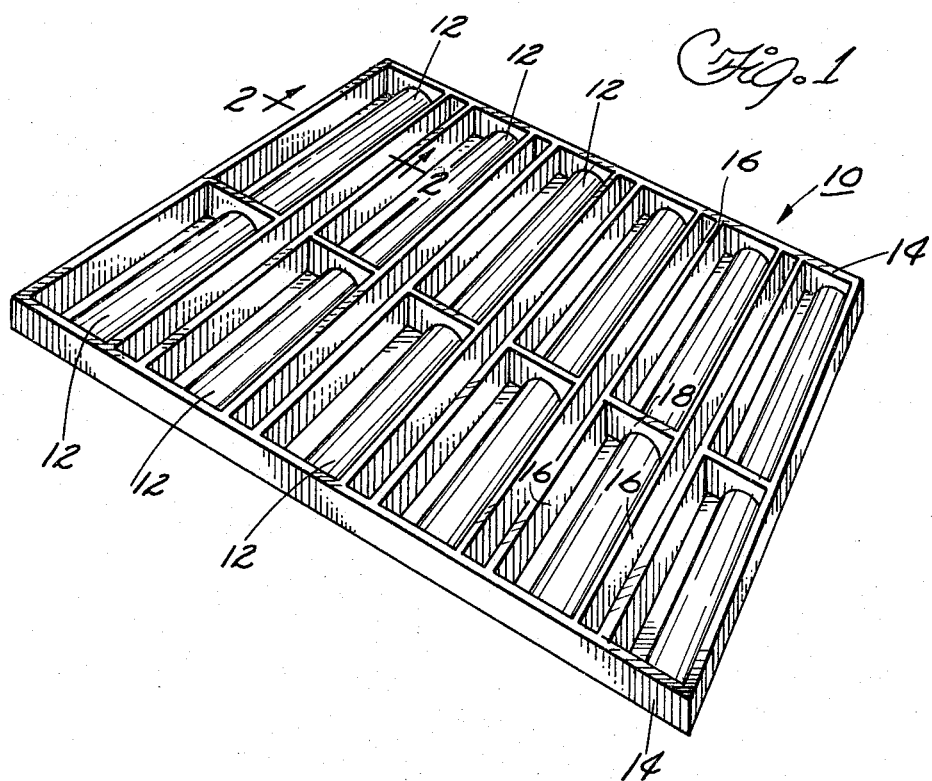
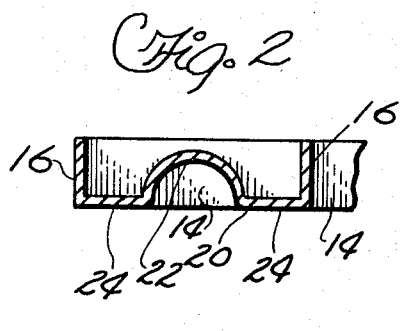
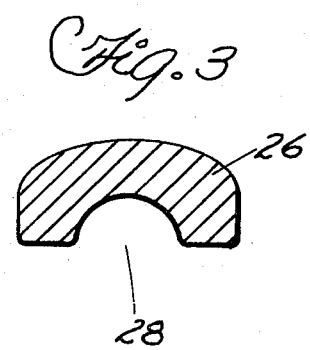
INVENTOR.
Peter H. Smith
BY
Pendleton, Neuman,
Seibold & Williams
Attorneys

United States Patent Office 3,326,119
Patented June 20, 1967

3,326,119
TRAY
Peter H. Smith, Maidenhead, England, assignor to J. Lyons & Company, Limited, London, England, a corporation of England
Filed Dec. 9, 1963, Ser. No. 329,096
2 Claims. (Cl. 99—428)

This invention relates to baking trays, and more particularly to such trays which are adapted for baking buns of the type employed to hold a frankfurter in a sandwich commonly referred to as a hot dog.

In the prior art, such buns have most commonly been of two basic types. In one type, the bun is molded as an integral form and is sliced open to permit the insertion of the frankfurter therein to form a sandwich. In the other type, the bun is also molded as an integral form, and a groove is molded into one surface of the bun of such dimensions as to accommodate the frankfurter therin for the formation of an open-face type of sandwich.

Both of these prior types of buns have been satisfactory for the purpose for which they were intended, but are unsatisfactory for purposes of cooking a hot dog, including a bun and a frankfurter, in a microwave oven of the type disclosed and claimed in co-pending application Ser. No. 293,685 filed by Peter H. Smith on July 9, 1963, now Patent No. 3,283,113.

In the above application, there is disclosed and claimed apparatus for cooking hot dogs by the application of microwave energy to an oven compartment defined by a hollow cylindrical tube. During the cooking of the hot dog, the oven compartment, together with the hot dog therein, is rotated about its longitudinal axis in order to insure uniform cooking of the hot dog. One other requirement for uniformity of cooking is that the bun and the frankfurter be substantially axially symmetric with respect to the boundary of the oven compartment, so that the rotation of the oven compartment does not materially change the geometry of the load formed by the frankfurter and bun. This requires that the bun itself, when formed into a sandwich surrounding the frankfurter, be substantially axially symmetric. Neither of the above described types of frankfurter buns are sufficiently axially symmetric to yield optimum results when prepared by means of the microwave oven of the aforementioned application.

It has also been known in the prior art to prepare rolls and buns having a greater degree of axial symmetry by baking them in fully enclosed molds. Such molds, however, must be constructed of at least two disconnectable parts to permit extraction of the buns after baking. The construction of the molds is therefore relatively expensive, and the preparation of buns with such molds is also rendered relatively complex and expensive by the necessity of connecting and disconnecting the various parts of the molds for each batch. Such molds become even more complicated when an attempt is made to mold half-sections of a bun separately, with a recess or groove provided in each half-section to accommodate the frankfurter after assembly of the hot dog.

The present invention makes use of the fact that the dough from which the bun is formed rises during the baking process to form a bulged exterior surface of the completed bun, where the surface is not confined by a mold or the like. In accordance with the present invention, a half-bun is prepared by baking it in a mold which defines the interior surfaces of the bun, which are to engage the frankfurter and another like half-bun to form the completed hot dog, while the exterior surfaces are left largely unconfined and derive an axially symmetric surface by the action of the dough rising during baking.

Therefore, the present invention does not employ removable covers or other disconnectable parts to confine the entire external surface of the bun. This results in hot dog buns which are substantially axially symmetric and ideally suited for use with the microwave oven of the aforementioned application, but which may be easily and inexpensively prepared, without the necessity of fitting together separate parts of mold forms during the baking process.

Accordingly, it is the principal object of the present invention to provide a mold in which a half-bun may be prepared to form, in combination with another like half-bun, an axially symmetric hot dog bun.

It is another object of the present invention to provide a tray having no moving or disconnectable parts, in which dough may be baked to form a segment of an axially symmetric hot dog bun.

These and other objects and advantages of the present invention will become manifest upon examination of this specification and the accompanying claims and drawings.

In one embodiment of the present invention, there is provided a tray in which a plurality of half sections of hot dog buns may be prepared in individual molds, each of such molds being so constructed and arranged as to confine some surfaces of a bun formed in the mold while leaving other surfaces unconfined, to form a section of a hollow cylindrical bun in which the inner and outer surfaces have substantially circular cross sections.

Reference will now be made to the accompanying drawings in which:

FIG. 1 is a perspective view of a tray embodying the present invention;

FIG. 2 is a cross-sectional view of a portion of the tray of FIG. 1, taken along the section 2—2; and FIG. 3 is a cross-sectional view of a bun formed by baking rough in one of the molds of the tray of FIG. 1.

FIG. 1 illustrates a tray generally indicated at 10 embodying the present invention, and having a plurality of compartments or molds generally indicated at 12, in which half-buns, suitable for being assembled together in pairs to form axially symmetric hot dog buns, may be formed. As illustrated in FIG. 1, the tray has a pair of end walls 14, which extend continuously for the length of the tray, and serve to support the mold compartments attached thereto. The mold compartments 12 are arranged in pairs. Each pair of mold compartments 12 has a pair of side walls 16 connected between the end walls 14, and an intermediate wall 18 connected between the side walls 16. The intermediate wall 18 is shared by the two molds of the pair, which are arranged longitudinally with respect to each other extending between the two end walls 14 of the tray. The side walls 16 of each of the mold pairs are spaced apart to permit hot gases to flow through the spaces or gaps in the tray 10 during the baking process.

A cross-sectional view of one of the mold compartments is illustrated in FIG. 2. The side walls 16 are connected to a bottom wall 20 which has a central convex portion 22, disposed in a shape of a longitudinal bulge or welt having an exterior surface with a substantially circular cross section. Two additional portions 24 are substantially co-planar and are disposed on opposite sides of the bulge 22 between the two side walls 16. All of the bottom and side walls 16, 22 and 24 are preferably formed of a single sheet of sheet metal or the like, which may readily be formed to the desired shapes, and may also easily be soldered or to assemble the various portions of the tray. The end walls 14 and intermediate walls 18 are also preferably sheet metal.

In the use of the tray, one or more molds is provided with a measured quantity of dough, and then subjected to heat to bake the dough. It will be seen with respect to FIG. 2 that the bottom wall 20 confines the dough within the mold as it is baked to mold the interior surfaces of the half-bun produced by the mold. The top of the dough placed in the mold is left unconfined, however, and accordingly rises during baking to assume the shape illustrated in cross section in FIG. 3.

It will be seen with reference to FIG. 3 that the half-bun produced by the use of the mold of the present invention is substantially axially symmetric about an axis 28 extending through the center of the molded recess in which the frankfurter is placed. The bun produced by the tray of the present invention has an exterior surface, as shown in FIG. 3, which is not precisely axially symmetric, but is nevertheless sufficiently so to yield good results when cooked in an electronic oven such as that disclosed in the Smith application referred to above.

From the foregoing, the present invention has been sufficiently described as to enable others skilled in the art to adapt the same for use under varying conditions of service without departing from the essential features of novelty involved which are intended to be defined and secured by the appended claims.

What is claimed is:

1. An open mold adapted to form a half section of a hot dog bun by baking the same in said mold, said mold comprising side and bottom walls formed of sheet metal, and a pair of end walls secured to said side and bottom walls to define an open container, said bottom wall having a pair of co-planar portions, and a convex elongate portion centrally disposed between said co-planar portions, said side walls being connected to said co-planar portions and extending substantially normal thereto, and said side walls having a height substantially less than the height of said bun, whereby said side walls conform generally to the surface of a circular cylinder having its axis disposed in the plane of said co-planar portions and equi-distant from said side walls.

2. A tray incorporating a plurality of molds, each of said molds comprising side and bottom walls formed of sheet metal and a pair of end walls secured to said side and bottom walls to define an open container, said bottom wall having a pair of co-planar portions, and a convex elongate portion centrally disposed between said co-planar portions, said side walls being connected to said co-planar portions and extending substantially normal thereto, said tray having a pair of elongate end walls connected to opposite ends of the side and bottom walls of each of said molds, the adjacent side walls of adjacent ones of said molds being spaced apart.

References Cited
UNITED STATES PATENTS

| | | | |
|---|---|---|---|
| 1,517,918 | 12/1924 | Pierson | 249—129 X |
| 1,568,742 | 1/1926 | Jung | 249—133 |
| 1,696,343 | 12/1928 | Burdick | 107—54.28 |
| 1,738,301 | 12/1929 | Kornreich. | |
| 1,817,690 | 8/1931 | Hubert | 107—54 X |
| 2,012,815 | 8/1935 | Hodges | 249—117 |
| 2,222,112 | 11/1940 | Miller. | |
| 2,810,338 | 10/1957 | Dawson | 249—113 X |

WALTER A. SCHEEL, *Primary Examiner.*

IRVING BUNEVICH, J. SHEA, *Assistant Examiners.*